Aug. 22, 1967

R. L. LEONARD 3,336,815

AUTOMATIC CONTROL VALVE SYSTEM FOR A MULTIPLE SPEED RATIO
POWER TRANSMISSION MECHANISM

Filed June 9, 1965

INVENTOR:
RICHARD L. LEONARD
BY
ATTORNEYS.

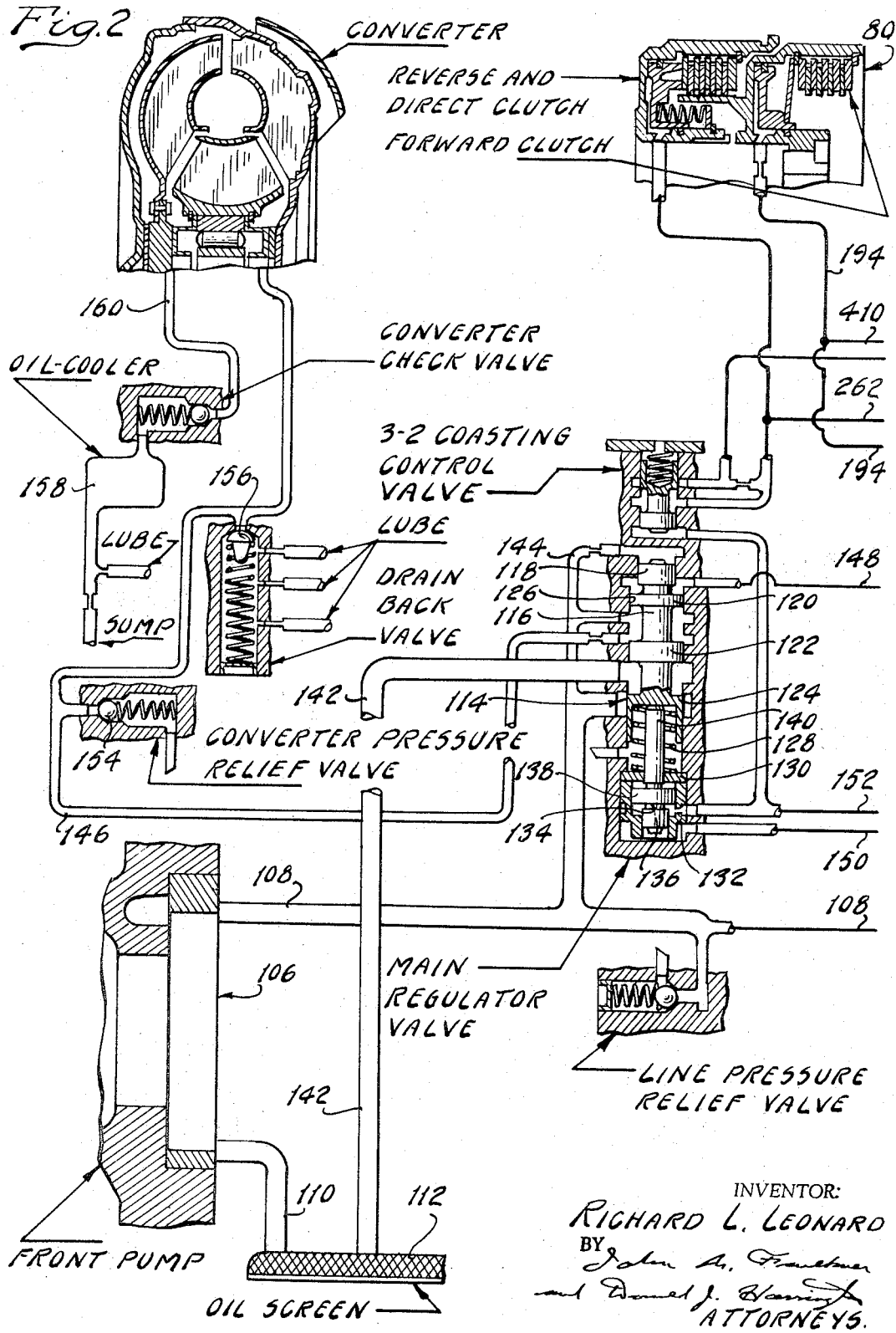

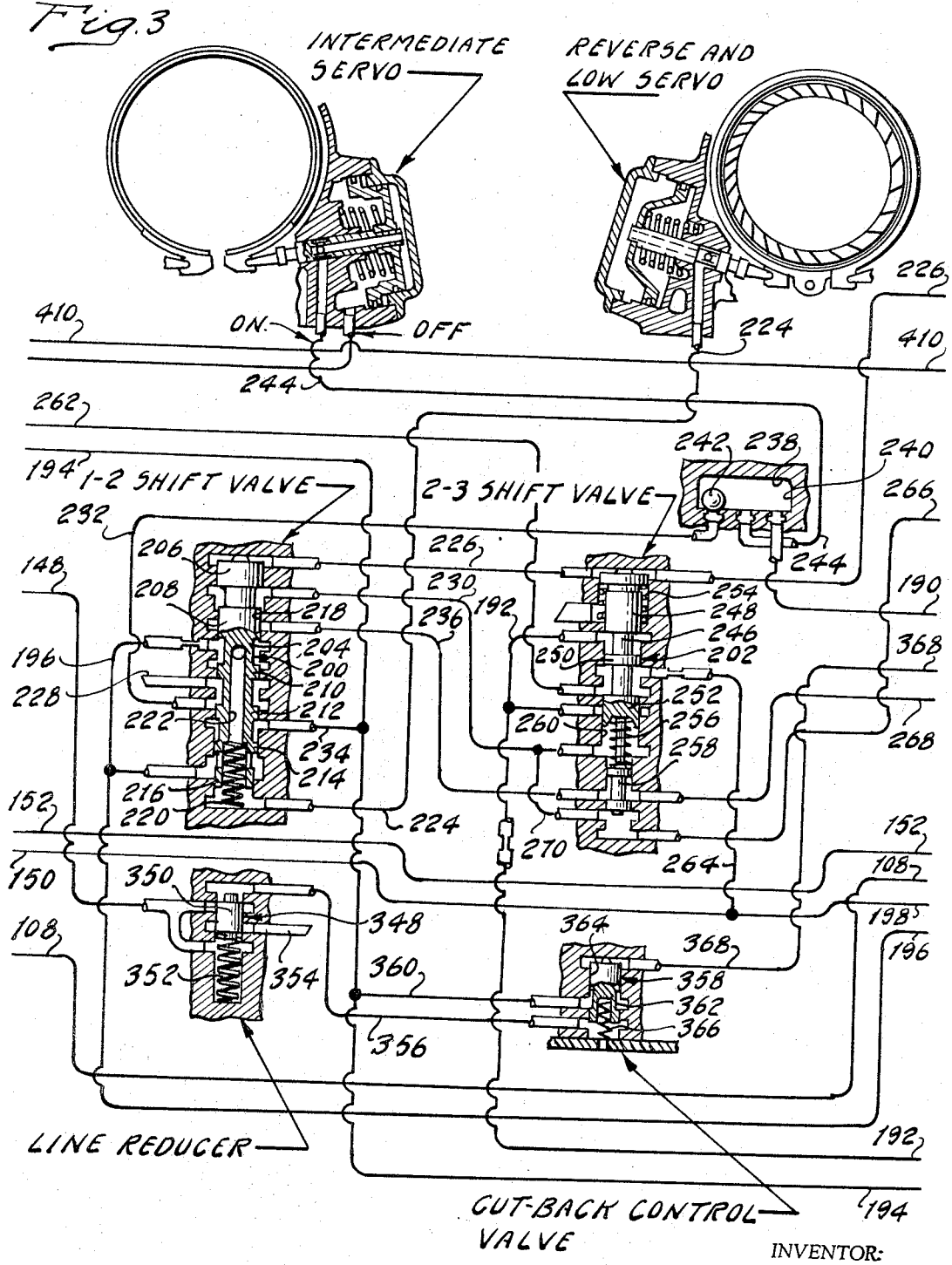

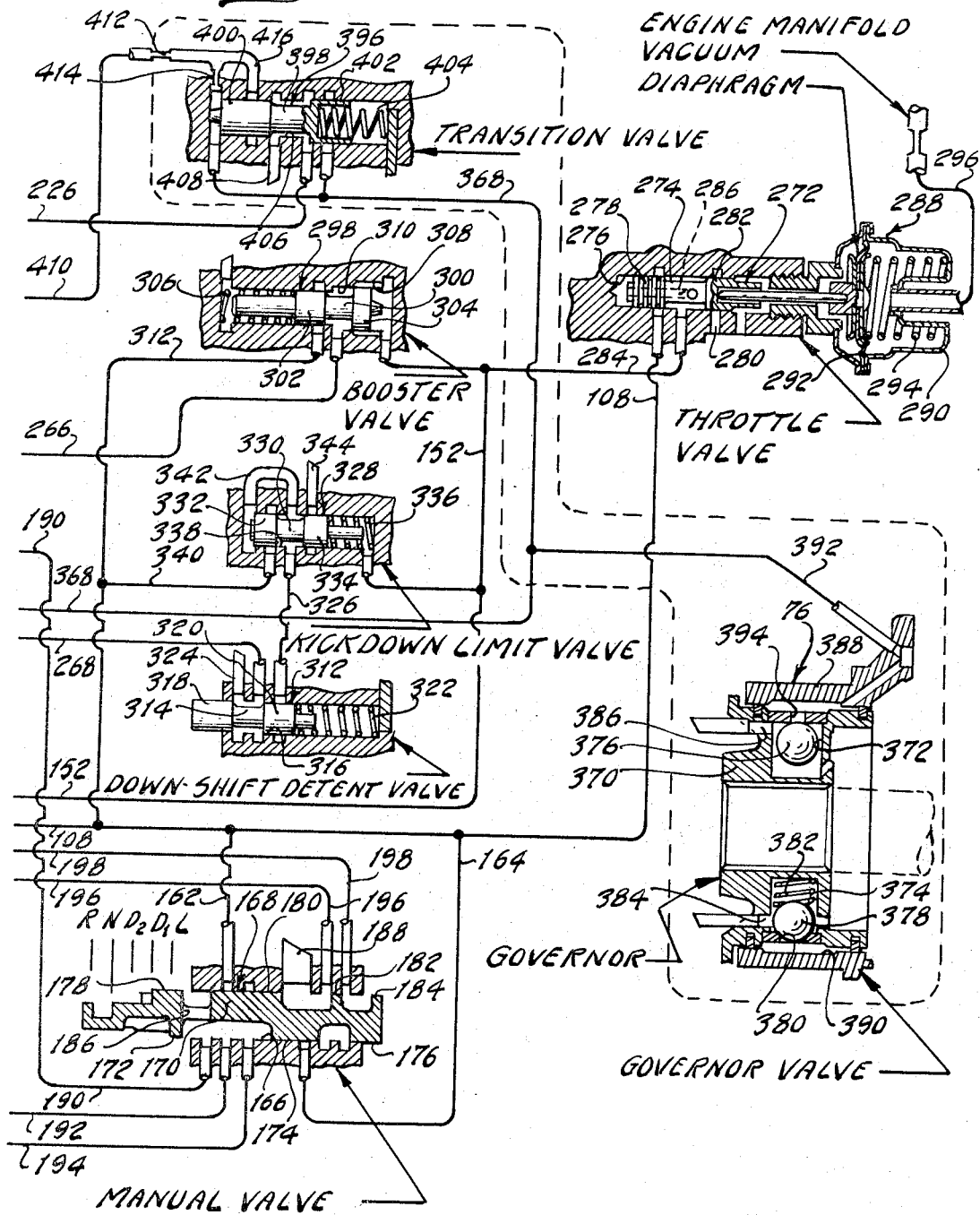

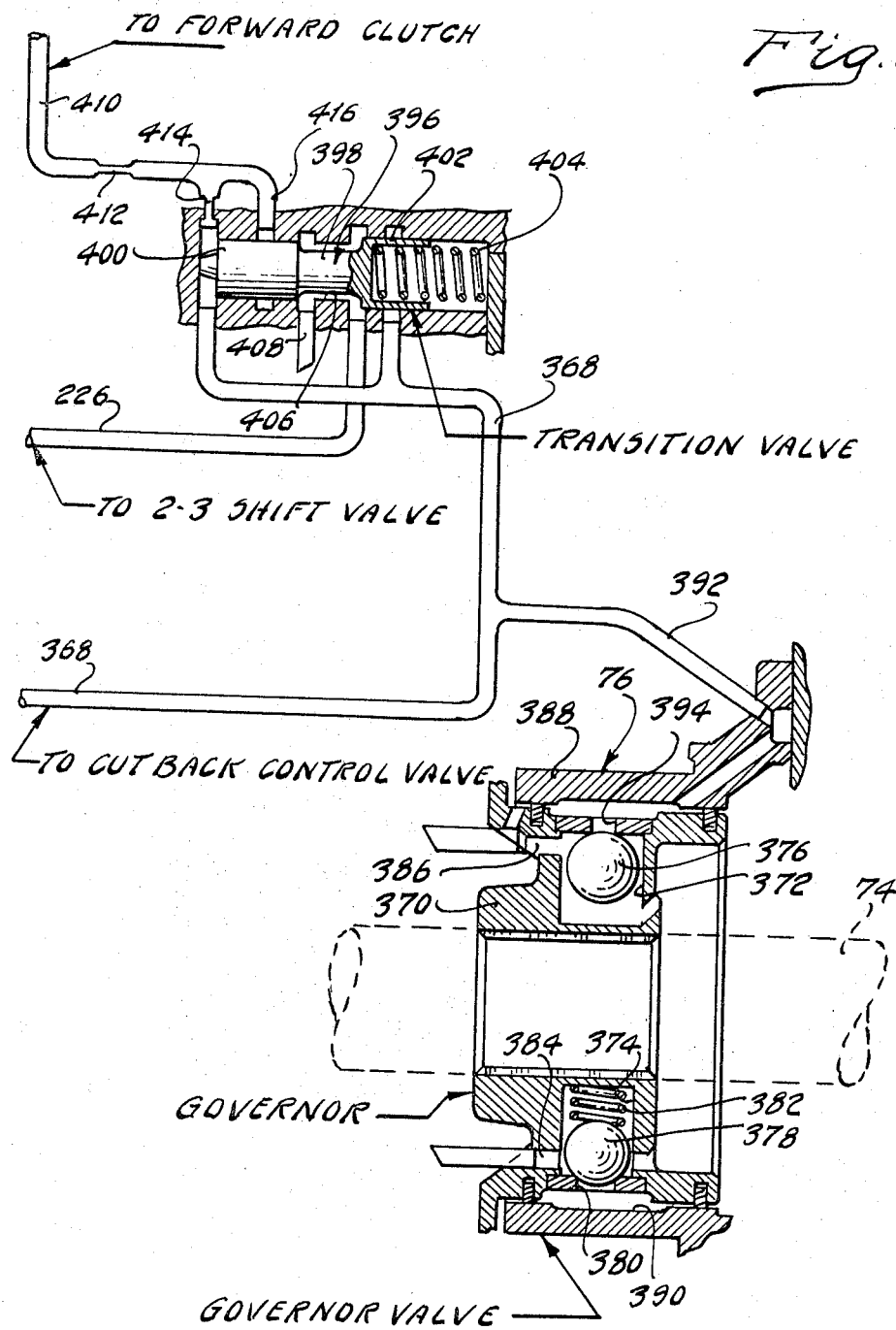

United States Patent Office 3,336,815
Patented Aug. 22, 1967

3,336,815
AUTOMATIC CONTROL VALVE SYSTEM FOR A MULTIPLE SPEED RATIO POWER TRANSMISSION MECHANISM
Richard L. Leonard, Farmington, Mich., assignor to Ford Motor Company, Dearborn, Mich., a corporation of Delaware
Filed June 9, 1965, Ser. No. 462,658
14 Claims. (Cl. 74—472)

My invention relates generally to multiple speed ratio automatic power transmission mechanisms for use in automotive vehicle drivelines. It relates more particularly to improvements in a power transmission control valve system which include a simplified valve arrangement capable of initiating speed ratio changes at the precise speed that will result in optimum shift quality for any given engine torque developed during operation. The provision of a control system of this type is a principal object of my invention.

It is a further object of my invention to provide an automatic control valve system for use in an automotive vehicle driveline wherein multiple shift valves are employed for initiating at least two speed ratio upshifts during acceleration of the vehicle from a standing start and wherein the shift valves respond to a speed signal that is obtained by means of an orificing governor valve mechanism.

It is a further object of my invention to provide a control valve system of the type set forth in the foregoing paragraph wherein the governor valve mechanism that produces the speed signal is capable of producing at low speeds a regulated speed signal pressure for establishing the first speed ratio shift point at the desired vehicle speed and which is capable of producing a modified signal at high speeds for initiating a final speed ratio change at the proper vehicle speed during the acceleration period.

In a preferred embodiment of my invention I have provided an orificing governor valve mechanism that is connected drivably to driven portions of the transmission mechanism. It includes a pair of fluid flow orifices and a pair of registering ball valve elements capable of controlling the rate of flow through the orifices. The governor valve mechanism is supplied with control pressure from an engine driven pump that is used also as a supply pressure source for fluid pressure operated clutch and brake servos in the transmission system.

In order to establish a proper minimum shift point and to separate that minimium shift point from the advanced throttle upshift point for the final speed ratio change, I have provided a transition valve that is capable of introducing an auxiliary flow restriction in the control pressure feed passage for the governor valve mechanism. At low vehicle speeds the transition valve responds to an increase in vehicle speed or governor pressure to eliminate the auxiliary orifice from the control pressure feed passage for the governor valve mechanism. In this way the final transmission upshift point is extended to a value that is consistent with optimum shift quality. The provision of a transition valve and governor valve arrangement in a valve system of this type is a further object of my invention.

It is another object of my invention to provide a valve system of the type described in the foregoing paragraphs wherein the transition valve is caused to function also as a signal valve for exhausting the governor pressure signal or distributing it from the governor valve mechanism to the governor pressure responsive shift valves which in turn control the automatic speed ratio changes. I contemplate that in this fashion the minimum throttle upshift points may be calibrated independently of governor pressure although the other shift points that are obtained at advanced speeds during acceleration under torque are dependent upon changes in governor pressure.

It is a further object of my invention to provide a valve system of the type set forth in the foregoing objects wherein the transition valve is capable of establishing with the shift valves a minimum throttle upshift point so that the shift valves themselves can be calibrated to satisfy the requirements of a part throttle downshift and a wide open throttle downshift without reference to the requirements for a minimum throttle upshift.

It is a further object of my invention to provide a valve system of the type above set forth wherein the transition valve is capable of establishing a minimum throttle upshift point that occurs at a higher speed than the speed at which a zero throttle downshift to the lowest speed ratio occurs during coasting operation of the vehicle.

It is a further object of my invention to provide a valve system of the type above set forth wherein provision is made for eliminating the adverse influence on shift quality of design tolerances in the control circuit pump and the governor valve assembly.

Further objects and features of my invention will become apparent from the following description and from the accompanying drawings, wherein:

FIGURE 1 shows in schematic form an automatic power transmission mechanism capable of being used in an automotive vehicle driveline;

FIGURE 2, FIGURE 3 and FIGURE 4 show in schematic form an automatic control valve system for controlling the operation of fluid pressure operated clutch and brake servos for the mechanism of FIGURE 1; and FIGURE 5 is an enlarged view of the governor valve and transition valve of the valve system of FIGURES 2, 3 and 4.

In FIGURE 1 the engine of the automotive vehicle driveline is designated generally by reference character 10. It includes a carburetor 12 for controlling the induction of an air-fuel mixture to the intake manifold of the engine shown in part at 14. The flow of the air-fuel mixture through the throat of the carburetor 12 is regulated by a throttle valve that is under the control of the vehicle operator, a driver controlled linkage shown in part at 16 being provided for this purpose.

The crankshaft 18 of the internal combustion engine 10 is connected drivably by means of a drive plate 20 to an impeller 22 of a hydrokinetic torque converter shown generally at 24. The torque converter unit includes a bladed turbine 26 and a bladed stator 28 each of which is situated in toroidal fluid flow relationship with respect to the impeller 22 in a common torus circuit. Stator 28 is situated between the flow exit section of the turbine 26 and the flow entrance region of the impeller 22. It is mounted for rotation about a stationary stator sleeve shaft 30 which is connected to the relatively stationary transmission housing shown in part at 32. An overrunning brake having roller elements 34 is used for anchoring the bladed stator 28 to the stationary sleeve shaft 30 and inhibiting rotation of the stator 28 in a direction opposite to the direction of rotation of the impeller. Freewheeling motion of the stator in the other direction, however, is permitted during operation of the converter unit in the fluid coupling range.

Turbine 26 is connected directly to turbine shaft 36 which serves as a power input member for the gearing.

Two simple planetary gear units are separately identified by reference characters 38 and 40. Gear unit 38 includes a ring gear 42, a carrier 44, planetary pinions 46 which are journaled rotatably upon the carrier 44, and a sun gear 48. Pinions 46 mesh with ring gear 42 and sun gear 48. The second planetary gear unit 40 includes ring gear 50, a carrier 52 and planetary pinions 54 which are journaled rotatably upon the carrier 52. Sun gear 48 forms also a part of the gear unit 40 so that each gear unit is defined in part by a common sun gear. Carrier 52 defines a brake drum 56 which is surrounded by a brake band 58. Drum 56 is connected to the inner race 60 of an overrunning brake assembly 62. This assembly includes an outer race 64 which is connected to the stationary transmission housing. The outer race 64 can be cammed to receive overrunning brake roller elements which inhibit rotation of the carrier 52 in one direction but permit freewheeling motion thereof in the opposite direction whenever the brake band 58 is disengaged.

Brake band 58 can be applied and released by means of a fluid pressure operated servo 66. This servo includes a cylinder 68 within which is positioned a servo piston 70. Fluid pressure is applied to the pressure chamber defined by the cylinder 68 and the piston 70 through a feed passage 72. When the servo is pressurized brake band 58 becomes applied to inhibit rotation of the carrier 52 in either direction although it is adapted particularly to accommodate torque reaction as torque is delivered from a driven shaft to the engine under vehicle coasting conditions. It also accommodates torque reaction during reverse drive operation. This torque is delivered from turbine shaft 36 to the driven member.

In this embodiment the driven member is in the form of a tailshaft 74. The carrier 44 and the ring gear 50 are connected directly to the shaft 74. The driven speed of the shaft 74 is sensed by a governor mechanism 76 which will be described with reference to the drawings which illustrate the control system.

The vehicle traction road wheels 78 are connected drivably to the shaft 74 through a suitable differential and axle assembly and driveline. Turbine shaft 36 is connected to a driving member of a selectively engageable forward clutch 80. The driven member of the clutch 80 is connected to ring gear 42. Both members of the clutch 80 carry friction discs which may be urged selectively into engagement by means of a fluid pressure operated clutch servo that comprises in part an annular piston 82 located within an annular cylinder defined by the driving member of the clutch 80. The annular cavity defined in part by the piston 82 is applied with clutch pressure through a feed passage 84. The driving member for the clutch 80 also serves as a driving member for direct and reverse clutch 86. The driven member of clutch 86 is connected by means of a drive shell 88 to the sun gear 48. This drive shell encircles the forward clutch 80 and the forward planetary gear unit 38. The driven member of the clutch 86 defines an annular cylinder within which an annular piston 90 is received. The fluid pressure chamber defined in part by the piston 90 is fed by means of a feed passage 92.

The driven member of clutch 86 defines a brake drum about which is positioned a brake band 94. This brake band can be applied and released by means of a double acting fluid pressure operated servo 96 having a cylinder 98 and a double acting piston 100. The piston 100 defines in part on either side thereof a pair of fluid pressure chambers which are supplied with fluid pressure by means of separate feed passages. The piston 100 is connected mechanically to the operating end of brake band 94 by a suitable mechanical connection 102. A corresponding mechanical connection between the operating end of brake band 58 and the piston 70 is shown at 104.

The structure of FIGURE 1 can be conditioned for operation in any one of three forward drive ratios and a single reverse drive ratio. To obtain the lowest forward drive speed ratio, forward clutch 80 is applied. As the engine 10 drives impeller 22, turbine torque is developed and this turbine torque is delivered through shaft 36 and through engaged clutch 80 to the ring gear 42. Since the carrier 44 is connected to the driven shaft 74, its rotation is resisted. This tends to cause sun gear 48 to rotate in a direction opposite to the direction of rotation of shaft 36. Carrier 52 becomes anchored against the relatively stationary housing by means of the overrunning brake 62. This then causes a forward driving torque to be imparted to the sun gear 50. This torque is delivered directly to the driven shaft 74. Thus a split torque delivery path between the shaft 36 and the shaft 74 is established.

Intermediate speed ratio operation is obtained by applying brake band 94. This is done by pressurizing the fluid pressure working chamber on the left-hand side of the servo piston 100. The forward clutch 80 remains applied. Thus the sun gear 48, which becomes anchored, is capable of acting as a reaction element. Turbine torque continues to be delivered through the forward clutch 80 to the ring gear 42; but since sun gear 48 acts as a reaction member, carrier 44 rotates at an increased speed relative to the speed of shaft 36. This carrier rotation is imparted to the driven shaft 74.

To establish direct drive operation both clutches are applied and brake band 94 is released. Thus the sun gear 48 becomes locked to the ring gear 42 and the elements of the planetary gearing rotate in unison. This establishes a direct driver ratio between shaft 36 and shaft 74.

The overrunning brake 62 freewheels during intermediate speed ratio operation and during high speed, direct drive operation. In each of the three driving speed ratios described in the foregoing paragraphs, the brake band 58 was released. It can be applied, however, to permit continuous operation in the low speed ratio if this action is desired. When it is so applied it anchors the carrier 52 against rotation in either direction so that it can accommodate torque reaction during operation in the lowest speed ratio as well as when the vehicle wheels drive the engine during coasting.

To establish reverse drive operation, brake band 58 is applied, brake band 94 is released, clutch 80 is released, and clutch 86 is applied. Under these conditions turbine torque is delivered from shaft 36 to the drive shell 88 through engaged direct and reverse clutch 86. Turbine torque is delivered then through the drive shell 88 to the sun gear 48. Carrier 52 acts as a reaction member since it is anchored by brake band 58. Thus the ring gear 50 is driven in a reverse direction thereby imparting reverse motion to the shaft 74.

In FIGURES 2, 3 and 4 I have illustrated in schematic form a valve system for controlling the operation of the clutch and brake servos of the system of FIGURE 1.

In the valve system of FIGURES 2, 3 and 4, numeral 106 designates generally a positive displacement, engine driven, front pump. The high pressure side of the pump 106 is connected to a main control pressure passage 108. The low pressure side of the pump 106 is connected to a transmission sump through a passage 110. Passage 110 communicates with an oil screen 112 which is located in the sump, the latter being defined in part by the lower region of the transmission housing.

The pressure in the passage 108 is regulated at a desired operating level by a main regulator valve 114. This valve comprises a multiple land valve spool 116 upon which is formed valve lands 118, 120, 122 and 124. The valve spool 116 is slidably situated within a valve chamber 126 which is formed with internal valve lands that cooperate and register with the external valve lands of valve spool 116. Valve springs 128 situated at the lower end of the chamber 126 normally urge the spool 116 in an upward direction. The springs 128 are anchored upon a back-up member 130 which is situated between a shoulder formed in the chamber 126 and a valve sleeve 132.

A line pressure booster valve element 134 is slidably situated within the sleeve 132. It is formed with differential diameter lands 136 and 138. It includes also a stem 140 which engages the spool 116 so that pressure forces acting on the element 134 are transferred directly to the spool 116.

The regulator valve chamber 126 communicates with the low pressure transmission sump through a flow return passage 142. Control pressure in passage 108 is distributed through passage 144 to the upper end of the land 118. A converter pressure feed passage 146 communicates with the torus region of the torque converter 24 and with the chamber 126 at a location adjacent land 122. As the valve spool 116 is shifted under the influence of control pressure on the upper end of land 118, passage 146 becomes uncovered by land 122 thereby establishing communication between passages 108 and 146. Upon a further increase in the pressure in passage 108, passage 144 is brought into communication with passage 142 through the annular space in chamber 126 situated between lands 124 and 122. This establishes a bypass flow. The springs 128 resist shifting movement of the spool 116 in a downward direction. Thus the pressure that is maintained in passage 108 is determined by the calibration of springs 128 as the valve spool 116 assumes a pressure regulating condition.

Lands 118 and 120 define a different area that is subjected to a so-called cutback pressure in passage 148. The function of the valves that produce the cutback pressure will be described subsequently. The force produced by the cutback pressure in passage 148 opposes the force of springs 128 so that the regulator valve is caused to maintain a lower pressure in passage 108. The cutback pressure is introduced in passage 148 whenever the driveline is operated with the torque converter at a reduced torque ratio. During operation of the driveline with the torque converter operating with an increased torque ratio, an increased control pressure is desired in order to maintain adequate capacity of the clutch and brake servos. Such a high control pressure is not desired, however, when the torque converter torque ratio decreases and the driveline is caused to shift from one speed ratio to a higher speed ratio. For this reason cutback pressure is introduced to passage 148 after the torque ratio of the converter becomes reduced but prior to the time that the speed ratio changes occur during the acceleration period.

When the driveline is conditioned for reverse drive operation, control pressure is caused to be distributed through passage 150 to the lower end of land 136. The sleeve 132 is suitably ported to establish the necessary fluid connection. This causes an increase in the effective line pressure maintained in passage 108 during reverse drive operation. The pressure force acting on land 136 supplements the force of springs 128.

The differential area defined by lands 138 and 136 is in fluid communication with a throttle pressure passage 152. This passage is subjected to a signal pressure that is proportional in magnitude to engine intake manifold pressure. The valve system that establishes this pressure signal will be described subsequently. Thus the magnitude of the pressure maintained by the regulator valve in passage 108 is determined in part by the magnitude of the intake manifold pressure of the internal combustion engine.

The passage 146 is provided with a pressure relief valve 154 to prevent a build-up of an excessive pressure in the torus circuit of the converter. A drainback valve 156 also is in communication with passage 146. It normally is closed with a very light spring to prevent draining of the converter when the transmission system is idle. The downstream side of the valve 156 communicates with a transmission lubrication system.

The flow return side of the torus circuit of the converter communicates with the oil cooler 158 through a return passage 160. The downstream side of the cooler 158 communicates with certain lubrication points in the transmission system and with the transmission sump. Passage 108 communicates with control pressure passages 162 and 164, both of which communicate with a valve chamber 166 for a manual selector valve 168. This valve includes a multiple land valve element 170 which is formed with two series of valve lands situated on opposite sides thereof. The lands of the first series are shown at 172, 174 and 176. The lands of the second series are shown at 178, 180, 182 and 184. Recesses are formed between lands 182 and 184, between lands 180 and 182, between lands 178 and 180, between lands 172 and 174, and between lands 174 and 176. The recess between lands 172 and 174 communicates with the recess between lands 178 and 180, a cross-over passage 186 being provided for this purpose.

The chamber 166 communicates with exhaust regions at either end thereof. It communicates also with an exhaust port 188.

The valve element 170 can be shifted to any one of several operating positions which are identified by the symbols R, N, D2, D1 and L. These symbols identify respectively the positions corresponding to the reverse drive position, the neutral position, the second drive range position, the first drive range position and the manual low drive position. The manual selector valve 168 distributes pressure from passages 162 and 164 to various regions of the circuit as it is positioned. This distribution occurs through communicating passages 190, 192, 194, 196 and 198. When the manual valve assumes the neutral position shown, pressure distribution to the various servos of the transmission system is interrupted. In this case passages 190, 192 and 194 are exhausted through the left-hand end of the valve chamber 166. Passage 162 is blocked by land 180 and passage 164 is blocked by land 174. Passage 196 is exhausted through exhaust port 188 and passage 190 is exhausted through the right-hand end of the valve chamber.

If the manual valve element 170 is shifted to the first position R, passage 164 is brought into communication with passage 196 and passage 198. Distribution of pressure from passage 164 to passages 196 and 198 occurs through the recess between lands 174 and 176, through annular grooves in chamber 166 adjacent passage 196 and through the space between lands 182 and 184. The transmission system then will be conditioned for acceleration from a standing start in the intermediate speed ratio. One automatic upshift to the high speed ratio will occur when the vehicle speed increases to a given value for any given manifold pressure. When it assumes this position passages 196 and 198 are exhausted through exhaust port 188. Passage 164 is blocked by land 174 and passage 162 is blocked by land 180. Passages 190, 192 and 194 are exhausted through the left-hand end of the valve chamber 166. Thus pressure distribution to the control valve system does not take place and the transmission clutch and brake servos remain inoperative.

When the manual valve element 170 is shifted to the D2 position, land 180 uncovers passage 162 and lands 172 and 178 seal the left-hand end of the chamber 166. Passages 196 and 198 are brought into communication with exhaust port 188 through the recess situated between lands 180 and 182. Passage 162 is brought into fluid communication with passages 190, 192 and 194 so that each of the latter becomes pressurized.

If the manual valve element 170 is shifted to the D1 position, passages 164 and 162 are brought into communication with passages 192 and 194. Passage 190 is exhausted through the left-hand end of the valve chamber 166. Passages 196 and 198 are exhausted through the right-hand end of the valve chamber 166.

If the manual valve element 170 is shifted to the L position, both passages 190 and 192 are exhausted through the left-hand end of the valve chamber 166. Passage 162 is blocked by land 178, but passage 164 is brought into communication with passage 194. Passage 194 communicates also with passage 196. Passage 198, however, is exhausted through the right-hand end of the valve chamber 166.

It is seen from the foregoing description that passage 194 is pressurized whenever the manual valve element is moved to a forward drive position. Passage 194 communicates directly with the forward clutch so that the clutch is applied whenever the transmission is conditioned for forward drive operation. Distribution of pressure to the direct and reverse clutch and to the brake servo is controlled by the 1–2 shift valve assembly 200 and by a 2–3 shift valve assembly 202. Valve assembly 200 includes a multiple land valve element 204 having spaced lands 206, 208, 210, 212, 214 and 216. Valve element 204 is situated within a valve chamber 218 which is formed with internal valve lands that cooperate with the external valve lands of the valve element 204. Valve element 204 is urged in an upward direction by valve spring 220. Passage 196 communicates with the valve chamber 218 at a location adjacent land 208. Communication is established between passage 196 and the lower end of the chamber 218 through an internal passage 222. A reverse and low servo feed passage 224 communicates with the lower end of the chamber 218. Thus when the manual valve is shifted to the reverse or low position, pressure is distributed from passage 196 through the valve element 204 and hence to the low and reverse servo thereby applying the latter. The servo pressure acts upon the valve spool 204 to maintain it in the downshift position shown in the drawing.

Governor pressure is distributed to the upper end of land 204 through a governor pressure passage 226. The source of the governor pressure will be described subsequently.

Whenever the valve element 204 is shifted downwardly under the influence of governor pressure, it is not possible to establish a connection between passage 224 and passage 196. Passage 224 becomes exhausted through the passage 222 and a communicating exhaust port 228 when the valve element 204 is in a downward position.

The magnitude of the governor pressure that will cause the valve element 204 to shift will depend upon the magnitude of the modulated throttle pressure in passage 230. This passage communicates with the chamber 218 at a location adjacent land 206. Land 206 is slightly larger in diameter than land 208 so that the modulated throttle pressure establishes a force on the valve element 204 that tends to maintain it in the position shown in the drawing and to oppose the influence of the governor pressure.

The feed passage 232 for the apply side of the intermediate servo communicates with the chamber 218 at a location intermediate lands 210 and 212. When the valve element 204 assumes the position shown, passage 232 is brought into communication with exhaust port 228.

Passage 196 is exhausted whenever the manual valve assumes the D1 or D2 position. If it is assumed that the manual valve is in either one of the drive range positions, passage 234, which communicates with the forward clutch feed passage 194, distributes control pressure to the 1–2 shift valve assembly at a location between lands 214 and 212, the diameter of the latter being greater than the diameter of the former. When the valve element 204 is moved to an upshift position under the influence of governor pressure in passage 226, communication is established between passages 232 and 234. At the same time communication between passage 232 and exhaust port 228 is interrupted. Pressure then is made available to the apply side of the intermediate servo to establish a speed ratio change from the low speed ratio to the intermediate speed ratio. The differential area defined by lands 212 and 214 is exhausted through exhausted passage 196. Thus movement of the valve element 204 in a downward direction occurs with a snap action. In a similar fashion the differential area defined by lands 206 and 208 becomes exhausted through a downshift pressure passage 236 which communicates with the valve chamber 218 adjacent land 208. Valve land 206 blocks passage 230.

Passage 232 supplies control pressure to the intermediate servo through a three position check valve 238. Valve 238 comprises a valve chamber 240 within which is situated a ball valve element 242. Passage 232 communicates with the chamber 240 at one of three valve ports. A second valve port provides communication between chamber 240 and a passage 244 which extends to the apply side of the intermediate servo. A third port establishes communication between chamber 240 and passage 190 which communicates with a manual valve. This passage is exhausted whenever the manual valve element 170 assumes any position other than the D2 position. If the manual valve assumes a D1 position, the ball valve element 242 will be shifted in chamber 240 to block passage 190. Chamber 240 then establishes a fluid connection between passages 232 and 244.

Land 214 is slightly larger than land 216 thus defining a differential area that is subjected to the pressure in passage 196 whenever the manual valve is shifted to the reverse position R or the low speed ratio position L. If the manual valve is shifted to the low position L when the 1–2 shift valve assembly is in the upshift position, a force will be added to the valve element 204 which will tend to urge it to a downshift position. This will not occur, however, until the speed of the vehicle is sufficiently low to permit the upwardly directed forces on valve element 204 to overcome the opposing force of the governor pressure. Once the 1–2 shift valve assembly assumes the downshift position, however, the lower end of land 216 is subjected to the pressure that then is introduced to the low and reverse servo. Thus the valve element 204 is held in the low speed ratio position with no possibility of a subsequent upshift upon an increase in the governor pressure.

The 2–3 shift valve assembly is effective to pressurize the release side of the intermediate servo and to pressurize the reverse and direct clutch to accomplish a speed ratio shift from the intermediate speed ratio to the high speed ratio. The 2–3 shift valve assembly includes a multiple land valve element 246 which has formed thereon spaced valve lands 248, 250 and 252. Valve element 246 is urged in an upward direction by a first valve spring 254 and a second valve spring 256, the latter being situated between valve spool 246 and a modulator valve element 258. Valve spool 246 is positioned within a valve chamber 260 having formed therein a series of valve lands that register with the lands 248, 250 and 252. Passage 192, which, as explained previously, is pressurized when the manual valve element assumes the D2 or the D1 positions, communicates with the valve chamber 260 at a location intermediate valve lands 248 and 250. It also communicates with the valve chamber 260 at a location adjacent land 252. A reverse and direct clutch feed passage 262 communicates with chamber 260 at a location between lands 252 and 250.

When the manual valve element 170 is shifted to the reverse position R, passage 198, which is pressurized, distributes control pressure to a passage 264 which is in fluid communication with passage 262 through the valve chamber 260. Valve element 246 assumes the upward position shown under these conditions. Thus the reverse and direct clutch becomes pressurized. Pressure is distributed to the reverse and low servo through passage 196, passage 222 and passage 224.

Governor pressure acts on valve land 248. When the governor pressure increases to a predetermined value for any given engine throttle setting as the vehicle operates in the intermediate speed ratio, the valve element 246 will be shifted in a downward direction thereby conditioning the mechanism for high speed ratio operation. When this occurs land 250 blocks communication between passages 264 and 262. The differential area defined by lands 248 and 250 is exhausted through passage 264 so that downward movement of the valve element 246 will occur with a snap action. Land 248 will block passage 192. At the same time passage 192 is brought into fluid communication with passage 262 so that control pressure is distributed from passage 192 and through passage 262 to the direct drive clutch. This effects a speed ratio upshift to the high speed ratio as explained previously.

The throttle modulator valve 258 is slidably positioned within a reduced diameter portion of the chamber 260. The output pressure of the throttle booster valve subsequently to be described is distributed to the lower end of the valve spool 258 through a passage 266. This creates a pressure on the valve spool 258 which is opposed by the spring 256.

An exhaust passage 268 communicates with the lower region of the chamber 260 so that the valve element 258 is caused to modulate the pressure in passage 266 to produce a modulated throttle pressure in a communicating passage 270. This pressure is distributed to the previously described passage 230 which communicates also with the lower end of the valve land 252.

A throttle valve assembly identified generally by reference character 272 includes a double land valve spool 274 which is situated slidably within a throttle valve chamber 276. Control pressure from passage 108 is distributed to the chamber 276 at a location adjacent land 278 of the spool 274. An exhaust port 280 communicates with the chamber 276 at a location adjacent the second land 287 of the valve spool 274. A primary throttle pressure passage 284 communicates with the chamber 276 at a location intermediate the two lands 278 and 282. A crossover passage 286 is formed in the valve element 274 and provides communication between passage 284 and the left-hand side of the land 278.

A vacuum diaphragm servo 288 actuates the throttle valve assembly. It includes a housing 290 having a flexible diaphragm 292. A throttle valve spring 294 acts upon the diaphragm 292 and normally urges the spool 274 in a left-hand direction. The diaphragm 292 and the housing 290 cooperate to define a manifold pressure chamber that is in communication with the engine intake manifold of the internal combustion engine through a manifold pressure passage 296. The throttle valve assembly thus is effective to modulate the pressure in passage 108 in response to changes in engine intake manifold pressure and to produce a resultant pressure signal in passage 284 that is proportional in magnitude to the engine intake manifold pressure.

The pressure in passage 284 is distributed to passage 152 which extends, as explained previously, to the main regulator valve. In this way the magnitude of the regulated pressure in the valve system is increased upon an increase in the magnitude of the engine intake manifold pressure. Since manifold pressure is an approximate indicator of engine torque, the capacity of the transmission clutch and brake servos is varied so that they can accommodate any engine torque that may be obtained as the driveline torque delivery requirements change.

Passage 284 communicates also with a throttle booster valve assembly 298. This assembly includes a valve spool 300 which has formed thereon valve lands 302 and 304, the diameter of the latter being greater than the diameter of the former. A valve spring 306 normally urges the valve spool 300 in a right-hand direction. When it is positioned in this fashion, direct communication is established between passage 284 and passage 266. This communication takes place through axial grooves 308 in the valve chamber 310 within which the valve spool 300 is situated.

The diameter of land 304 is greater than the diameter of land 302. The pressure in passage 266 acts upon the differential area of lands 302 and 304. A control pressure passage 312 communicates directly with passage 108 and its communication with chamber 310 is controlled by land 302. During movement of the engine throttle throughout an initial range of settings, the magnitude of the primary throttle pressure in passage 284 is insufficient to move the spool 300 against the opposing influence of spring 306. Thus the signal in passage 266 is equal to the signal in passage 284. When the engine carburetor throttle setting is advanced to a value greater than an intermediate value, the force acting upon the right-hand side of land 304 will be sufficient to cause the valve spool 300 to modulate the pressure in passage 312 to produce a resultant pressure signal in passage 266 that is greater than the pressure signal in passage 284. The magnitude of the signal then made available to the shift valves thus more closely resembles the actual engine torque demand, and it is more useful for this reason in establishing shift points than the signal in passage 284.

In addition to the automatic speed ratio changing tendencies of the 1-2 shift valve assembly and the 2-3 shift valve assembly, there is included in the system a downshift detent valve that can be connected mechanically to the engine carburetor throttle and actuated thereby to overrule the automatic operation of the shift valves. The downshift detent valve is shown at 312. It includes a simple valve spool 314 slidably situated within a valve bore 316. Spool 314 has spaced valve lands 318 and 320. Spool 314 is urged in a left-hand direction by a valve spring 322 thereby normally establishing communication between passage 268 and an exhaust port 324. When it is in this position valve land 320 blocks passage 326 which extends to the kickdown limit valve 328. When the carburetor throttle setting is advanced to the wide open position, the mechanical throttle linkage causes valve spool 314 to shift in a right-hand direction thereby blocking exhaust port 324 while connecting passage 326 to passage 268. The kickdown limit valve pressure then causes the transmission system to assume a downshift condition if the governor pressure at the instant a forced downshift is demanded is lower than a predetermined value.

In order to establish the proper forced downshift point, the pressure in passage 326 is tailored by the previously mentioned kickdown limit valve 328. This valve includes a valve spool 330 having spaced lands 332 and 334. Valve spool 330 is urged in a left-hand direction by valve spring 336. Valve element 330 is situated within a valve chamber 338. Pressure is applied to valve chamber 338 through a branch passage 340 which communicates with the control pressure passage 312. A feedback passage 342 distributes the pressure in passage 326 to the left-hand side of land 332. Land 334 controls an exhaust port 344. Thus the valve element 330 is effective to modulate the pressure in passage 340 and to provide in passage 326 a tailored downshift signal pressure for the shift valve assemblies.

Distribution of cutback control pressure to passage 148 is made by a line reducer valve 348. This valve includes a single diameter valve element 350 which is urged in an upward direction, as viewed in the drawings, by a spring 352. When it is in an upward position, communication is established between passage 148 and an exhaust port 354. The upper end of the valve element 350 communicates with the passage 356. When control pressure is distributed to passage 356 it acts upon valve element 350. The spring 352 causes a reduction in this pressure. It will not be possible, therefore, for a line pressure cutback to occur if the magnitude of the line pressure for any given driving condition is less than the line pressure reduction for which the valve 348 is calibrated.

Passage 356 is pressured with fluid pressure that is distributed to it by a cutback control valve 358 which receives its pressure from a passage 360 extending from the forward clutch feed passage 194. Cutback control valve 358 includes a double land valve element 362 slidably situated within a valve chamber 364. It is urged in an upward direction by valve spring 366. Governor pressure from the governor valve assembly 76 is distributed to the upper end of the valve element 362 through a governor pressure passage 368.

After the governor pressure in passage 368 reaches a predetermined value, valve element 362 is shifted thereby establishing communication between passages 360 and 356. The cutback control valve is calibrated to cause cutback pressure to be distributed to passage 356 at a time prior to the 1–2 upshift during acceleration from a standing start.

The governor valve assembly 76 includes a rotatable governor valve body 370 within which is formed a first cylindrical valve chamber 372 and a second cylindrical valve chamber 374. A large diameter ball valve element 376 is positioned in chamber 372 and is adapted to move radially therein. A smaller ball element 378 is situated for radial movement within chamber 374. A large diameter orifice 380 registers with the valve element 378. A spring 382 normally urges the element 378 to an orifice closing position. Each governor valve chamber is vented to atmosphere through exhaust ports shown at 384 and 386.

The valve body 370 is rotatably situated within a relatively stationary sleeve 388 which is connected to the transmission housing surrounding the valve body 370. It has an annular passage 390 which is defined in part by the sleeve 388. This passage communicates with a control pressure feed passage 392.

Ball valve element 376 is adapted to register with an orifice 394 which is smaller in diameter than orifice 380. Valve body 370 is carried, as explained previously, by driven shaft 74. As the shaft is rotated, the centrifugal forces acting upon the valve elements 376 and 378 cause a restriction of the orifices 394 and 380, respectively. This creates a back pressure in passage 392. As the speed increases the degree of restriction increases. Thus the pressure signal in passage 392 increases. At some predetermined speed, valve spring 382 will be overcome thereby permitting leakage to occur at two points—namely, through both of the orifices 394 and 380. This changes the degree of pressure build-up in passage 392 upon increasing speeds of the driven shaft 74.

It is desirable to provide a governor mechanism that is capable of producing a useful speed signal at relatively low speeds but which is capable also of producing a maximum governor pressure signal that approaches in magnitude the maximum control pressure available in the system. For this reason there is provided a transition valve 396 which is effective to provide an increased volume of pressurized fluid to passage 392 at high speeds and to reduce the rate of fluid supplied to passage 392 at low speeds. The transition valve includes a valve spool 398 which has a pair of spaced valve lands 400 and 402, the diameter of the latter being greater than the diameter of the former.

A valve spring 404 urges the valve spool 398 in a left-hand direction. The valve chamber 406, which receives the spool 398, is formed with internal valve lands that cooperate with lands 400 and 402. Governor pressure passage 226 communicates with chamber 406 at a location intermediate lands 400 and 402. An exhaust port also communicates with chamber 406 at a location adjacent land 400 as shown at 408. When the valve element 398 assumes the position shown, passage 226 is exhausted through exhaust port 408. Passage 368, which communicates with governor valve assembly feed passage 392 extends to the transition valve chamber 406 at a location adjacent land 402. Land 402 blocks passage 368 when element 398 assumes the position shown.

A pressure feed passage for the transition valve is shown at 410. This passage communicates with the forward clutch feed passage 194. Passage 368 is in fluid communication with passage 410 through a pair of flow restricting orifices 412 and 414. These orifices are situated in series relationship as indicated. Governor pressure acts on the left-hand side of valve land 400. When the governor valve assembly 76 produces a back pressure or governor pressure in passage 368 that is sufficient to shift the valve spool 398 in a right-hand direction, land 400 uncovers branch passage 416 which establishes a bypass flow path around orifice 414. Thus the fluid feed for the governor valve assembly 76 takes place at high speeds through only a single orifice—namely, orifice 412—since orifice 414 is bypassed. This permits the magnitude of the pressure in passage 368 to approach more closely the maximum control pressure available in the system.

In contrast, at low speeds the valve spool 398 is in a left-hand direction so that the feed for the governor valve assembly 76 must take place through two series-related orifices. Thus an excessive fluid flow to the exhaust region through the governor valve assembly 76 is avoided. Furthermore, it is possible with such a double orifice arrangement to produce a useful governor signal at relatively low speeds.

When the transition valve spool 398 is shifted in a right-hand direction at high vehicle speeds, passage 368 is brought into fluid communication with passage 226 as land 402 uncovers passage 368. At the same time land 400 blocks exhaust port 408. Thus the speed signal acts upon the differential area of lands 400 and 402. The valve spool will not return to the position shown in the drawings until the vehicle speed reaches a value that is substantially lower than the value at which the spool 398 was shifted in a right-hand direction in the first instance.

As soon as passage 226 is brought into communication with passage 368, governor pressure is made available immediately to the shift valve assemblies. Thus an upshift from the low speed ratio to the intermediate speed ratio occurs immediately during the acceleration period.

In this improved arrangement the transition valve can be calibrated to initiate the automatic 1–2 upshift. Thus the shift valves can be calibrated to satisfy the automatic downshift requirements without reference to those variables that affect the 1–2 upshift quality. Thus a compromise in the requirements for a 2–1 downshift need not be made.

Coasting downshifts are obtained by reason of the action of the transition valve rather than the downshift detent valve. Such a downshift will occur, however, at a speed that is lower than the speed at which the transition valve caused an automatic upshift. The amount of the difference between these shift points can be varied simply by calibrating appropriately the differential area of the lands 400 and 402.

The use of a transition valve to initiate the automatic speed ratio changes during acceleration and during minimum throttle coasting operation eliminates the variables in the shift points that are due to the dimensional tolerances in the governor valve assembly and the main control pressure pump 106.

The 1–2 shift valve and the 2–3 shift valve are adapted to control so-called torque demand or part throttle downshifts as well as "through detent" downshifts. The restricted functions of the shift valves, especially the 1–2 shift valve assembly, thus makes it possible to control these advance throttle downshifts more accurately than has heretofore been possible.

Having thus described a preferred embodiment of my invention, what I claim and desire to secure by U.S. Letters Patent is:

1. In a control system for a multiple speed ratio power transmission mechanism having fluid pressure operated servos adapted to condition said mechanism for speed ratio changes, a fluid pressure source, conduit structure interconnecting said pressure source and said servos, distributor valve means situated in and partly defining said conduit structure for controlling selectively distribution of pressure to said servos, a governor valve assembly drivably connected to driven portions of said mechanism and adapted to produce a governor pressure signal that is functionally related in magnitude to the driven speed of said driven member, governor pressure passage means interconnecting said governor valve assembly and said distributor valve means whereby said signal is effective to produce an automatic response of said distributor valve means, and a pressure operated transition valve means situated in and partly defining said governor pressure passage and responsive to said governor pressure signal to establish a fluid connection between said governor valve assembly and said distributor valve means at high driven speeds and to interrupt such communication at lower driven speeds.

2. In an automatic control valve system for a power transmission mechanism having gear elements that define plural torque delivery paths between a driving member and a driven member, fluid pressure operated servos adapted to control relative motion of said gear elements, a fluid pressure source, conduit structure interconnecting said pressure source and said servos, shift valve means situated in and partly defining said conduit structure for selectively controlling distribution of pressure to said servos to initiate speed ratio changes, governor valve means connected drivably to said driven member for establishing a first pressure signal that is related in magnitude to the driven speed of said driven member, governor pressure passage means for establishing communication between said governor valve means and said shift valve means whereby the latter responds to changes in the magnitude of said first pressure signal, means for establishing a second pressure signal that is an indicator of the magnitude of the torque delivered through said mechanism, other passage means connecting said second-named signal establishing means to said shift valve means, and a transition valve means situated in and partly defining said governor pressure passage means including a pressure area subjected to said first signal for establishing communication between said governor valve means and said shift valve means during operation at high driven speeds and interrupting such communication at lower driven speeds.

3. In a control system for a multiple speed ratio power transmission mechanism having fluid pressure operated servos adapted to condition said mechanism for speed ratio changes, a fluid pressure source, conduit structure interconnecting said pressure source and said servos, distributor valve means situated in and partly defining said conduit structure for controlling selectively distribution of pressure to said servos, a governor valve assembly drivably connected to driven portions of said mechanism and adapted to produce a governor pressure signal that is functionally related in magnitude to the driven speed of said driven member, governor pressure passage means interconnecting said governor valve assembly and said distributor valve means whereby said signal is effective to produce an automatic response of said distributor valve means, a pressure operated transition valve means situated in and partly defining said governor pressure passage and responsive to said governor pressure signal to establish a fluid connection between said governor valve assembly and said distributor valve means at high driven speeds and to interrupt such communication at lower driven speeds, said governor valve assembly comprising a pair of flow restricting orifices and a pair of centrifugally operated valve elements, a separate valve element being in registry with each orifice, and a fluid connection between said pressure source and the upstream side of said orifices, said governor pressure passage means being in fluid communication with said fluid connection whereby the pressure in the latter is determined by the back pressure on the upstream sides of said orifices.

4. In an automatic control valve system for a power transmission mechanism having gear elements that define plural torque delivery paths between a driving member and a driven member, fluid pressure operated servos adapted to control relative motion of said gear elements, a fluid pressure source, conduit structure interconnecting said pressure source and said servos, shift valve means situated in and partly defining said conduit structure for selectively controlling distribution of pressure to said servos to initiate speed ratio changes, governor valve means connected drivably to said driven member for establishing a first pressure signal that is related in magnitude to the driven speed of said driven member, governor pressure passage means for establishing communication between said governor valve means and said shift valve means whereby the latter responds to changes in the magnitude of said first pressure signal, a source of a second pressure signal that is an indicator of the magnitude of the torque delivered through said mechanism, other passage means connecting said signal source to said shift valve means, a transition valve means situated in and partly defining said governor pressure passage including a pressure area in communication with said governor valve means for establishing communication between said governor valve means and said shift valve means during operation at high driven speeds and interrupting such communication at lower driven speeds, said governor valve means comprising a pair of flow restricting orifices and a pair of centrifugally operated valve elements, a separate valve element being in registry with each orifice, and a fluid connection between said pressure source and the upstream side of said orifices, said governor pressure passage means being in fluid communication with said fluid connection whereby the pressure in the latter is determined by the back pressure on the upstream sides of said orifices.

5. In a control system for a multiple speed ratio power transmission mechanism having fluid pressure operated servos adapted to condition said mechanism for speed ratio changes, a fluid pressure source, conduit structure interconnecting said pressure source and said servos, distributor valve means situated in and partly defining said conduit structure for controlling selectively distribution of pressure to said servos, a governor valve assembly drivably connected to driven portions of said mechanism and adapted to produce a governor pressure signal that is functionally related in magnitude to the driven speed of said driven member, governor pressure passage means interconnecting said governor valve assembly and said distributor valve means whereby said signal is effective to produce an automatic response of said distributor valve means, a pressure operated transition valve means situated in and partly defining said governor pressure passage and responsive to said governor pressure signal to establish a fluid connection between said governor valve assembly and said distributor valve means at high driven speeds and to interrupt such communication at lower driven speeds, and a pair of series-related flow restrictions situated between said governor valve assembly and said pressure source, said transition valve means including a bypass flow passage in parallel relationship with respect to one of said flow restrictions, said bypass flow passage being opened by said transition valve means as the latter is conditioned for high speed operation.

6. In an automatic control valve system for a power transmission mechanism having gear elements that define plural torque delivery paths between a driving member and a driven member, fluid pressure operated servos adapted to control relative motion of said gear elements, a fluid pressure source, conduit structure interconnecting said pressure source and said servos, shift valve means situated in and partly defining said conduit structure for selectively controlling distribution of pressure to said servos to initiate speed ratio changes, governor valve means connected drivably to said driven member for establishing a first pressure signal that is related in magnitude to the driven speed of said driven member, governor pressure passage means for establishing communication between said governor valve means and said shift valve means whereby the latter responds to changes in the magnitude of said first pressure signal, a source of a second pressure signal that is an indicator of the magnitude of the torque delivered through said mechanism, other passage means connecting said signal source to said distributor valve means, a transition valve means situated in and partly defining said governor pressure passage means including a pressure area in communication with said governor valve means for establishing communication between said governor valve means and said shift valve means during operation at high driven speeds and interrupting such communication at lower driven speeds, and a pair of series-related flow restrictions situated between said governor valve means and said pressure source, said transition valve means including a bypass flow passage in parallel relationship with respect to one of one of said flow restrictions, said bypass flow passage being opened by said transition valve as the latter is shifted to its high speed position.

7. In a control system for a multiple speed ratio power transmission system having fluid pressure operated servos adapted to condition said mechanism for speed ratio changes, a fluid pressure source, conduit structure interconnecting said pressure source and said servos, distributor valve means situated in and partly defining said conduit structure for controlling selectively distribution of pressure to said servos, a governor valve assembly drivably connected to driven portions of said mechanism and adapted to produce a fluid pressure signal that is functionally related in magnitude to the driven speed of said driven member, governor pressure passage means interconnecting said governor valve assembly and said distributor valve means whereby said signal is effective to produce an automatic response of said distributor valve means, a pressure operated transition valve means situated in and partly defining said governor pressure passage means and responsive to said pressure signal to establish a fluid connection between said governor valve means and said distributor valve means at high driven speeds and to interrupt such communication at lower driven speeds, said governor valve means comprising a pair of flow restricting orifices and a pair of centrifugally operated valve elements in registry with said orifices, a fluid connection between said pressure source and the upstream side of said orifices, said governor pressure passage being in fluid communication with said fluid connection whereby the pressure in the latter is determined by the back pressure on the upstream sides of said orifices, and a pair of series-related flow restrictions situated between said governor valve assembly and said pressure source, said transition valve means including a bypass flow passage in parallel relationship with respect to one of said flow restrictions, said bypass flow passage being opened by said transition valve as the latter is shifted to its high speed position.

8. In an automatic control valve system for a power transmission mechanism having gear elements that define plural torque delivery paths between a driving member and a driven member, fluid pressure operated servos adapted to control relative motion of said gear elements, a main fluid pressure source, conduit structure interconnecting said pressure source and said servos, shift valve means situated in and partly defining said conduit structure for selectively controlling distribution of pressure to said servos to initiate speed ratio changes, governor valve means connected drivably to said driven member for establishing a first pressure signal that is related in magnitude to the driven speed of said driven member, governor pressure passage means for establishing communication between said governor valve means and said shift valve means whereby the latter responds to changes in the magnitude of said pressure signal, a source of a second pressure signal that is an indicator of the magnitude of the torque delivered through said mechanism, other passage means connecting said signal source to said shift valve means, and a transition valve means situated in and partly defining said governor pressure passage means including a pressure area in communication with said governor valve means for establishing communication between said governor valve means and said shift valve means during operation at high driven speeds and interrupting such communication at lower driven speeds, said governor valve means comprising a pair of flow restricting orifices and a pair of centrifugally operated valve elements in registry with said orifices, a fluid connection between said main pressure source and the upstream side of said orifices, said governor pressure passage being in fluid communication with said fluid connection whereby the pressure in the latter is determined by the back pressure on the upstream sides of said orifices, and a pair of series-related flow restrictions situated between said governor valve assembly and said pressure source, said transition valve means including a bypass flow passage in parallel relationship with respect to one of said flow restrictions, said bypass flow passage being opened by said transition valve as the latter is shifted to its high speed position.

9. In a power transmission mechanism having gear elements that establish plural torque delivery paths between a driving member and a driven member, fluid pressure operated servos adapted to control the relative motion of said gear elements, a main fluid pressure source, conduit structure interconnecting said pressure source and said servos, shift valve means adapted to control distribution of pressure to said servos and situated in and partly defining said conduit structure whereby speed ratio changes can be initiated, a source of a first pressure signal that is determined by the magnitude of the torque delivered through said mechanism, a source of a second speed pressure signal that is proportional in magnitude to the driven speed of said driven member, means for distributing each of said signals to said shift valve means for actuating the same, and speed signal sensitive valve means for interrupting communication between said speed signal source and said shift valve means at low vehicle speeds and establishing such communication at high vehicle speeds whereby automatic upshift tendencies are controlled by said speed sensitive valve means and automatic downshift tendencies are determined by the relative magnitudes of said signals for any given operating condition.

10. In a power transmission mechanism having gear elements that establish plural torque delivery paths between a driving member and a driven member, fluid pressure operated servos adapted to control the relative motion of said gear elements, a main fluid pressure source, conduit structure interconnecting said pressure source and said servos, shift valve means adapted to control distribution of pressure to said servos and situated in and partly defining said conduit structure whereby speed ratio changes can be initiated, a source of a first pressure signal that is determined by the magnitude of the torque delivered through said mechanism, a source of a second speed pressure signal that is proportional in magnitude to the driven speed of said driven member, means for distributing each of said signals to said shift valve means for actuating the same, and speed signal sensitive valve means for interrupting communication between said speed signal source and said shift valve means at low vehicle speeds and establishing such communication at high vehicle speeds whereby automatic upshift tendencies are controlled by said speed sensitive valve means and automatic downshift tendencies are determined by the relative magnitudes of said signals for any given operating condition, said second signal source comprising a rotatable governor body driven by said driven member, a pair of fluid flow restricting orifices, centrifugally operated valve elements registering with said orifices and effective to restrict said orifices to a degree that is dependent upon the speed of rotation of said driven member, a fluid passage for supplying fluid under pressure to said orifices, a pair of series-related fluid flow restrictions in said fluid connection, said speed signal responsive valve means including a bypass flow passage in parallel relationship with respect to one of said flow restrictions and adapted to open the same when it assumes a high driven speed position.

11. In a torque delivery driveline having an internal combustion engine and a driven member, said engine being an air-fuel mixture intake manifold, gear elements adapted to establish plural torque delivery paths between said engine and said driven member, multiple servo means for controlling the relative motion of said gear elements to establish different speed ratios, conduit structure interconnecting said pressure source and said servos, shift valve means in said conduit structure adapted to control distribution of pressure to said servo means, a first pressure signal source connected to and responsive to changes in pressure in said manifold, a second pressure signal source responsive to driven speed of said driven member, means for distributing each of said signals to said shift valve means for actuating the same, and speed signal sensitive valve means for interrupting communication between said speed signal source and said shift valve means at low vehicle speeds and establishing such communication at high vehicle speeds whereby automatic upshift tendencies are controlled by said speed sensitive valve means and automatic downshift tendencies are determined by the relative magnitudes of said signals for any given operating condition.

12. In a torque delivery driveline having an internal combustion engine and a driven member, said engine being an air-fuel mixture intake manifold, gear elements adapted to establish plural torque delivery paths between said engine and said driven member, multiple servo means for controlling the relative motion of said gear elements to establish different speed ratios, conduit structure interconnecting said pressure source and said servos, shift valve means in said conduit structure adapted to control distribution of pressure to said servo means, a first pressure signal source connected to and responsive to changes in pressure in said manifold, a second pressure signal source responsive to driven speed of said driven member, means for distributing each of said signals to said shift valve means for actuating the same, and speed signal sensitive valve means for interrupting communication between said speed signal source and said shift valve means at low vehicle speeds and establishing such communication at high vehicle speeds whereby automatic upshift tendencies are controlled by said speed sensitive valve means and automatic downshift tendencies are determined by the relative magnitudes of said signals for any given operating condition, said second signal source comprising a rotatable governor body driven by said driven member, a pair of fluid flow restricting orifices, centrifugally operated valve elements registering with said orifices and effective to restrict said orifices to a degree that is dependent upon the speed of rotation of said driven member, a fluid passage for supplying fluid under pressure to said orifices, a pair of series-related fluid flow restrictions in said fluid connection, said speed signal responsive valve means including a bypass flow passage in parallel relationship with respect to one of said flow restrictions and adapted to open the same when it assumes a high driven speed position.

13. In a torque delivery driveline having an internal combustion engine and a driven member, said engine being an air-fuel mixture intake manifold, gear elements adapted to establish plural torque delivery paths between said engine and said driven member, multiple servo means for controlling the relative motion of said gear elements to establish different speed ratios, conduit structure interconnecting said pressure source and said servos, shift valve means in said conduit structure adapted to control distribution of pressure to said servo means, a first pressure signal source connected to and responsive to changes in pressure in said manifold, a second pressure signal source responsive to driven speed of said driven member, means for distributing each of said signals to said shift valve means for actuating the same, and speed signal sensitive valve means for interrupting communication between said speed signal source and said shift valve means at low vehicle speeds and establishing such communication at high vehicle speeds whereby automatic upshift tendencies are controlled by said speed sensitive valve means and automatic downshift tendencies are determined by the relative magnitudes of said signals for any given operating condition, the means for distributing said first signal to said shift valve means comprising a pressure modulating valve means in fluid communication with said main pressure source and said first pressure signal source for modifying the effective value of the first pressure signal made available to said shift valve means whereby the latter responds to changes in the demand for engine torque as speed ratio changes are initiated.

14. In a torque delivery driveline having an internal combustion engine and a driven member, said engine being an air-fuel mixture intake manifold, gear elements adapted to establish plural torque delivery paths between said engine and said driven member, multiple servo means for controlling the relative motion of said gear elements to establish different speed ratios, conduit structure interconnecting said pressure source and said servos, shift valve means in said conduit structure adapted to control distribution of pressure to said servo means, a first pressure signal source connected to and responsive to changes in pressure in said manifold, a second pressure signal source responsive to driven speed of said driven member, means for distributing each of said signals to said shift valve means for actuating the same, and speed signal sensitive valve means for interrupting communication between said speed signal source and said shift valve means at low vehicle speeds and establishing such communication at high vehicle speeds whereby automatic upshift tendencies are controlled by said speed sensitive valve means and automatic downshift tendencies are determined by the relative magnitudes of said signals for any given operating condition, said second signal source comprising a rotatable governor body driven by said driven member, a pair of fluid flow restricting orifices, centrifugally operated valve elements registering with said orifices and effective to restrict said orifices to a degree that is dependent upon the speed of rotation of said driven member, a fluid passage for supplying fluid under pressure to said orifices, a pair of series-related fluid flow restrictions in said fluid connection, said speed signal responsive valve means including a bypass flow passage in parallel relationship with respect to one of said flow restrictions and adapted to open the same when it assumes a high driven speed position, the means for distributing said first signal to said shift valve means comprising a pressure modulating valve means in fluid communication with said main pressure source and said first pressure signal source for modifying the effective value of the first pressure signal made available to said shift valve means whereby the latter responds to changes in the demand for engine torque as speed ratio changes are initiated.

References Cited
UNITED STATES PATENTS

| | | | |
|---|---|---|---|
| 2,667,085 | 1/1954 | Ackerman | 74—645 |
| 3,000,230 | 9/1961 | Froslie | 74—472 |
| 3,038,574 | 6/1962 | Roche. | |
| 3,274,848 | 9/1966 | Konrad et al. | 74—472 |

DONLEY J. STOCKING, *Primary Examiner.*

T. C. PERRY, *Assistant Examiner.*

UNITED STATES PATENT OFFICE

CERTIFICATE OF CORRECTION

Patent No. 3,336,815                                                             August 22, 1967

Richard L. Leonard

It is certified that error appears in the above identified patent and that said Letters Patent are hereby corrected as shown below:

Column 17, lines 2, 25 and 60, and column 18, line 19, "being", each occurrence, should read -- having --.

Signed and sealed this 24th day of March 1970.

(SEAL)
Attest:

Edward M. Fletcher, Jr.                              WILLIAM E. SCHUYLER, JR.

Attesting Officer                                                Commissioner of Patents